United States Patent [19]

Meinhold

[11] 4,303,877
[45] Dec. 1, 1981

[54] CIRCUIT FOR PROTECTING STORAGE CELLS

[75] Inventor: Henner Meinhold, Sandhausen, Fed. Rep. of Germany

[73] Assignee: Brown, Boveri & Cie Aktiengesellschaft, Mannheim-Käfertal, Fed. Rep. of Germany

[21] Appl. No.: 35,270

[22] Filed: May 1, 1979

[30] Foreign Application Priority Data

May 5, 1978 [DE] Fed. Rep. of Germany ....... 2819584
Sep. 7, 1978 [DE] Fed. Rep. of Germany ....... 2838996

[51] Int. Cl.³ .............................................. H02J 7/04
[52] U.S. Cl. ......................................... 320/6; 320/18; 320/36
[58] Field of Search ............................. 320/6, 15–18, 320/35, 36, 43

[56] References Cited

U.S. PATENT DOCUMENTS

| | | | |
|---|---|---|---|
| 3,102,222 | 8/1963 | Harmer | 320/15 X |
| 3,221,239 | 11/1965 | Langer et al. | 320/17 |
| 3,343,058 | 12/1967 | Deschamp et al. | 320/17 |
| 3,348,117 | 10/1967 | Howden | 320/18 |
| 3,393,355 | 7/1968 | Whoriskey et al. | 320/18 |
| 3,496,442 | 2/1970 | Carlisle | 320/18 |
| 4,061,955 | 12/1977 | Thomas et al. | 320/15 X |

FOREIGN PATENT DOCUMENTS 698137 11/1964 Canada .................................. 320/17

Primary Examiner—Robert J. Hickey
Attorney, Agent, or Firm—Herbert L. Lerner

[57] ABSTRACT

Battery formed of electrochemical storage cells of the alkali metal and chalcogen type in series or groups of several parallel-connected storage cells connected in series. To assure uniform charging and discharging of the storage cells, each series-connected cell or each group of parallel-connected cells, has parallel-connected to the cell or group of cells, a protective circuit. Upon reaching a given maximum charge or discharge, a cell or group of cells, the circuit acts to bridge i.e. short the cell or group of cells which has reached a maximum charge or discharge, and prevent further charge or discharge of such cell or group of cells. The circuit is functionally connected to a switch which is conductively connectible directly to the negative and positive electrodes of the cells and to the electric terminals. The protective circuit is directly connected to both terminals and the storage cell to at least one of the two terminals via the switch.

19 Claims, 8 Drawing Figures

CIRCUIT FOR PROTECTING STORAGE CELLS

BACKGROUND OF THE INVENTION

1. Field of the Invention

The invention relates to the uniform charging and discharging of electrochemical storage cells series-connected, or of groups of several parallel-connected storage cells series-connected to form a battery of the alkali metal and chalcogen type with at least one anode space for the accommodation of the anolyte and one cathode space for the accommodation of the catholyte, both spaces separated from each other by an alkali ion-conducting solid-electrolyte wall.

2. Description of the Prior Art

Such rechargeable electrochemical storage cells with solid electrolytes are very well suited for the construction of storage batteries of higher energy and power density. The $\beta$-aluminum oxide electrolyte used in sodium/sulfur storage cells, for instance, allows only sodium ions to pass. This means, in contrast to the lead storage battery, that practically no self-discharge takes place and that no secondary reactions occur when charging such as a water decomposition in the lead/lead-oxide system. Therefore, the current yield, i.e. the Faraday efficiency, of a sodium/sulfur storage cell is near 100%.

These advantages are opposed by the operational disadvantage that such cells must neither be overcharged nor overdischarged, as is possible with lead storage batteries. For this reason, the total capacity in a series-connection is determined by the storage cell having the least capacity. One particularly serious factor is that storage cells used, for instance, in a charged state differing from that of the other storage cells of the battery can never be synchronized with the rest of the line. With the lead storage battery it is possible to bring all storage cells to the same state by overcharging—with hydrogen/oxygen formation (equalizing charge).

To counteract this difference in the charged state of the storage cells of a battery, several storage cells are first connected in parallel before several such groups of parallel-connected storage cells are connected in series. Thereby, due to equalizing currents, the same charging state establishes itself in all storage cells within a group consisting of several parallel-connected storage cells. Viewed statistically, the total capacities of the individual groups differ less from each other than the capacities of individual storage cells.

However, a basic improvement of the charged state of a battery cannot be achieved in this manner, because the parallel block having the smallest capacity continues to determine the total capacity of the battery and the charged states of different blocks cannot be equalized.

Another disadvantage of these electrochemical storage cells shows up when a battery is discharged. For example, if one storage cell of a series-connection of many storage cells or if the parallel-connected storage cells of a group connected in series with other groups is already discharged, the discharge current of the not yet discharged storage cells of the battery acts upon the already discharged storage cells like an extraneously impressed current. Under the effect of this impressed current a polarity reversal of the cell voltage of the discharged storage cells occurs. They continue to discharge and are destroyed in the process.

SUMMARY OF THE INVENTION

It is an object of the invention to provide a battery having electrochemical storage cells connected in series or several parallel-connected storage cells connected as a group and such groups of parallel-connected storage cells connected in series, in which battery every storage cell may be charged to its maximum capacity. In addition, overdischarging of each storage cell of the battery is prevented.

With the foregoing and other objects in view, there are provided in accordance with the invention, electrochemical storage cells of the alkali metal and chalcogen type, connected to form a battery which can be uniformly charged and discharged, in which series-connected cells having positive and negative electrodes as individual cells or groups of several parallel-connected storage cells are series-connected to form a battery having a positive terminal and a negative terminal, with the cell having an anode chamber for containing alkali metal anolyte and a cathode chamber for containing chalcogen catholyte, with the anode chamber separated from the cathode chamber by an alkali ion-conducting solid electrolyte, a protective circuit shunted across each said series-connected cells which bridges the circuit through said series-connected cells upon said series-connected cells reaching a given maximum charge or discharge, said protective circuit in functional contact with a switch, said switch conductively connectible directly to the negative and positive electrodes of said series-connected cells and to the terminals of the battery, said protective circuit connected directly to the two terminals of the battery, and said series-connected cells connected to one of the two terminals via said switch.

Other features which are considered as characteristic for the invention are set forth in the appended claims.

Although the invention is illustrated and described herein as embodied in a circuit for protecting storage cells, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

According to the invention, to each series-connected storage cell or to each group of storage cells there is parallel-connected at least one protective circuit which, upon reaching a given maximum charge or discharge of the storage cells(s), bridges their circuit, the circuit is functionally connected to a switch which is conductively connectible directly to the negative and positive electrodes of the storage cell(s) and to the electric terminals. The protective circuit is connected directly to both terminals, and the storage cell(s) to at least one of the two terminals via the switch.

The protective circuit is advantageously formed of at least one first or several first series-connected, temperature-resistant diode(s), across which is shunted at least one heating element and a series-connection comprising at least one second temperature-resistant diode. In particular, the first diode(s) of the protective circuit is wired in forward direction and the second diode in blocking direction.

The protective circuit employs diodes having p-n junctions or Schottky junctions of a material with a band gap of more than 1.2 eV, corresponding to compounds of the III and V or the II and VI groups of the periodic system.

It is advantageous to use in the circuit gallium arsenide, gallium phosphate, silicon carbide, boron nitride, or cadmium sulfide diodes.

The diode(s) shunted across the heating element has a forward voltage equalling the maximum charging voltage of the storage cell or storage cells of a group. In one embodiment of the invention, the diode series-connected with the heating element is designed so that it takes over the current when the discharge voltage of the storage cell or storage cells of a group becomes negative, thereby separating the storage cell(s) from the circuit. Due to the use of temperature-insensitive diodes, preferably employing diodes having the above mentioned characteristics, a circuit is created which is designed for a temperature of at least 570° K. Since the diodes used are in particular resistant to high temperature, they may even be disposed inside the battery. This means that the diodes can be integrated as individual components in every storage cell, particularly in areas of the storage cell where insulating elements are located.

It is not absolutely necessary to dispose the protective circuit inside the battery for space saving reasons; it may also be installed outside in an adjacent area. The protective circuit may be formed of a less costly series-connection comprising a Zener diode and a heating element. The negative electrode of the Zener diode is then connected to the positive electric pole.

When the storage cell or storage cells of a group reach maximum charging capacity, the Zener diode takes over the charging current. When reaching a certain underdischarge of a storage cell or the storage cells of a group, the extraneously impressed current is likewise transferred to the Zener diode. In addition, the heating element also responds to this current and actuates the switch via the heat-conducting connection so that the storage cell(s) is separated from the circuit. The rated voltage of the Zener diode is advantageously selected to correspond to the maximum charging voltage of a storage cell or of a group of parallel storage cells. Furthermore, the Zener diode used in the protective circuit is designed so that it also becomes conducting at a discharge voltage of the storage cell(s) starting at $-0.7$ V.

In another embodiment of the invention the protective element consists of a series-connection of a voltage-dependent resistor and a heating element. They also protect the storage cell against overcharging or underdischarging. Here again, the charging current is advantageously taken up by the voltage-dependent resistor when the storage cell(s) reaches the maximum charging capacity. The same happens upon the attainment of a discharge voltage between $-0.7$ and $-2.5$ V. The heating element responds to the extraneously impressed current and actuates the switch via the heat-conducting connection to separate the storage cell(s) from the circuit.

Advantageously, every storage cell of a battery can be charged to its maximum capacity with the circuit according to the invention. It ensures moreover that none of the storage cells is discharged below a minimum so that destruction of the storage cells is prevented. In addition, it is possible with this circuit to include storage cells in the battery whose charging state differs from that of the other storage cells of the battery. This makes possible synchronization of these storage cells of a different charged state with the rest of the series-connected line of individual or groupwise combined, parallel-connected storage cells. Due to the switch controlled as a function of temperature, the storage cell(s) can be completely cut out of the circuit, because the heating element contained in the protective circuit responds to the extraneously impressed discharge current and actuates the switch accordingly.

The invention is explained below with reference to the drawings and the advance achieved by the invention demonstrated.

Figure 1:
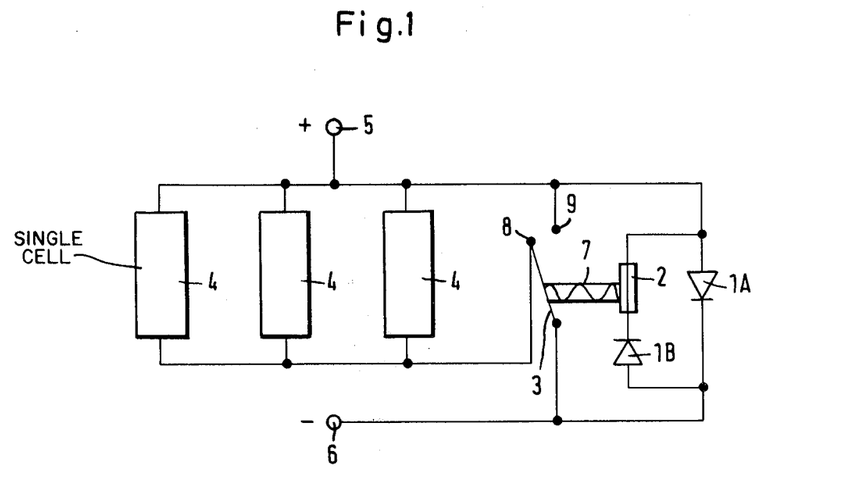
FIG. 1 diagrammatically shows a group of three parallel-connected storage cells in connection with a circuit with temperature-responsive diodes.

The circuit shown in FIG. 1 is composed essentially of two diodes 1A and 1B, a heating element 2, a switch 3, three electrochemical storage cells 4, a negative electric terminal 6 and a positive electric terminal 5, and a heat-conducting connection 7. The three storage cells 4 are connected in parallel and form a group. Such a group may be combined with other groups containing at least one storage cell or several parallel-connected storage cells in the form of a series-connection to form a battery.

The diodes 1A and 1B used in the circuit have p-n junctions or Schottky barriers of a material having a band gap of more than 1.2 eV, corresponding to compounds of the III and V or the II and VI groups of the periodic system. Gallium arsenide, gallium phosphate, silicon carbide, boron nitride, or cadmium sulfide diodes have proven to be particularly advantageous in the design of this circuit. Of course, there is also the possibility of using another element with the same properties. The point here is, in particular, that the diodes used be temperature-insensitive. They should preferably be stable up to a temperature of at least 570° K. and above.

The embodiment of the circuit shown in FIG. 1 is designed so that, to save space, it can be disposed within the battery. Therefore the individual elements should be temperature insensitive up to a predeterminable minimum temperature. In addition, the diodes 1A are to have a high forward voltage. The diode 1B is designed so that it goes into conduction upon the appearance of negative discharge voltages of the storage cell or group of storage cells, and takes over the current so that the storage cell(s) is cut out of the circuit.

In the circuit shown in FIG. 1 the positive electrodes of the storage cells 4 are connected to the positive electric terminal 5. The anode of the diode 1A is likewise connected to the terminal 5 while its cathode is wired to the negative electric terminal 6. The series-connection comprising the heating element 2 and the diode 1B is shunted across the diode 1A. The negative electrodes of the storage cells 4 are connected to the negative terminal 6 via a contact point 8 and the switch 3 which is in contact with this contact point.

The heating element 2, shunted across the diode 1A, is in contact with the switch 3 via a heat-conducting connection 7. The electrically conducting contact of switch 3 is connected to the contact point 8 in the normal operating condition. Also provided is a second contact point 9 which is wired to the positive electrodes of the storage cells 4 as well as to the positive terminal 5. The switch 3 can also be connected to this contact point 9.

Figure 2:
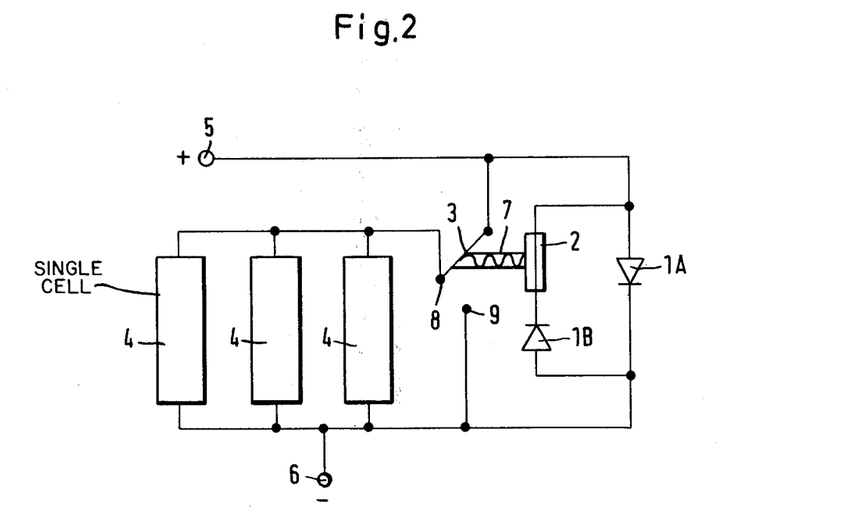
FIG. 2 shows a group of three parallel-connected storage cells with a variant of the circuit shown in FIG. 1.

As FIG. 2 shows, the negative electrodes of the parallel-connected storage cells 4 may also be connected directly to the negative terminal 6, while their positive electrodes can be connected to the positive terminal pole 5 via the switch 3. In this circuit, the above-mentioned contact point 9 is connected to the negative electrodes of the storage cells 4 and to the negative terminal 6. All other elements of the circuits are wired as shown in FIG. 1 and explained above.

Figure 3:
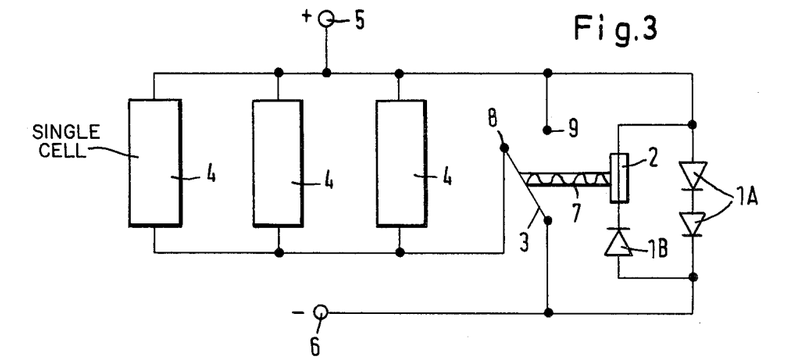
FIG. 3 shows a group of three parallel-connected storage cells in connection with a circuit with three series-connected diodes across which the series-connection of a heating element and a diode is shunted.

As already mentioned the diode 1A should have a very high forward voltage. If the forward voltage required is very high, it can often not be attained with one single diode 1A. In such cases, therefore, the desired forward voltage is obtained by the series-connection of two or more such diodes, as shown in FIG. 3. Therein, two diodes 1A are connected in series. Parallel to these two diodes 1A is the series-connection comprising the diode 1B and the heating element 2. Otherwise, the circuit design is identical with that shown in FIG. 1.

Figure 4:
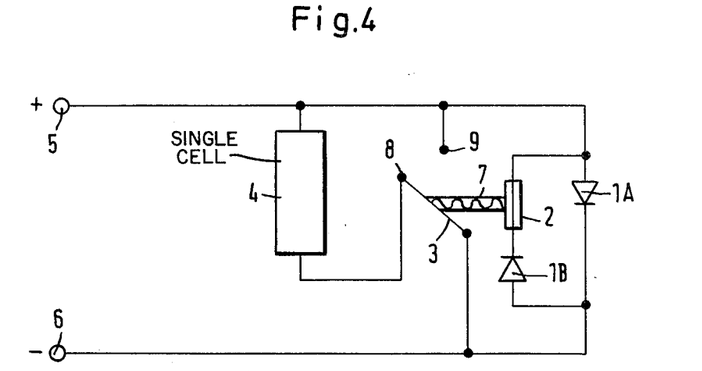
FIG. 4 shows the same circuit as in FIG. 1, except in connection with only one storage cell.

The circuit according to the invention is not only applicable to a multiplicity of storage cells connected in parallel, but as FIG. 4 shows, the circuit also applies to a single storage cell. The design of the circuit for such a single cell is identical with that for several parallel-connected storage cells. It also contains two diodes 1A and 1B, a heating element 2, a switch 3, and the two electric terminals 5 and 6.

As to design and their other characteristics, in particular as far as temperature insensitivity and forward voltage are concerned, the two diodes 1A and 1B correspond to the diodes shown in FIG. 1. Also in the case where the circuit according to the invention is connected to only one electrochemical storage cell 4, the anode of the diode 1A is wired to the positive terminal 5. The cathode of this diode is wired to the negative terminal 6. Here again, the series-connection comprising the heating element 2 and the diode 1B is shunted across the diode 1A. One electrode of the storage cell 4 is connected to the terminal 6 via the contact point 8 and the switch 3. The second electrode of the storage cell 4 is connected directly to the terminal 5. Here too, a heat-conducting connection 7 exists between the heating element 2 and the switch 3. To prevent an underdischarge of the storage cell 4, the electrical contact of switch 3, in connection with the contact point 8 in the normal operating condition, can be connected to a second contact point 9 which in turn is wired to the positive electrode of the storage cell 4 and to the terminal 5. All elements of this circuit are designed so that they can be disposed inside the battery on account of their temperature stability which is designed for at least 570° K.

If each storage cell 4 of a battery is equipped with such a circuit, then the two diodes 1A and 1B can be integrated into the respective storage cell 4. The diodes can be of special design in the form of elements used in the construction of the storage cell 4, such as insulating spacers, and can be assembled in the vicinity of the closure of the storage cell. The diode 1A, for instance, due to its high forward voltage, for instance, will serve as an insulating element until such time that as the storage cell has reached its maximum charging voltage. Only then will the diode 1A become current-carrying because its forward voltage is preferably set to the maximum charging voltage of the storage cell 4.

The diode 1B will function as a nonconducting element until such time as the storage cell 4 has a positive discharge voltage. Upon the appearance of negative discharge voltages it will become current-carrying and bridge (short) the circuit through the storage cells.

Figure 5:
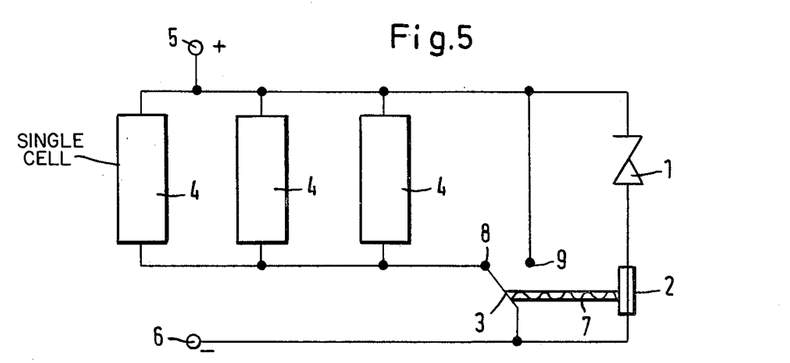
FIG. 5 shows a group of three storage cells in connection with a circuit with a Zener diode and a heating element.

If enough space is available so that the protective circuit for the storage cell(s) can also be disposed outside of the battery, the circuit modification shown in FIG. 5, which is less costly may be used.

In substance, the circuit shown in FIG. 5 is composed of a Zener diode 1, a heating element 2, a switch 3 and three storage cells 4. The three storage cells 4 are parallel-connected and form a group. The positive electrodes of the storage cells 4 are connected to the positive electric terminal 5. The cathode of the Zener diode 1 is also connected to this positive terminal pole 5. Its anode 1 is in contact with the negative terminal pole 6 via the heating element 2.

A heat-conducting connection 7 is disposed between the heating element 2 and the switch 3. In the normal operating condition the electrically conducting contact of switch 3 is connected to the contact point 8, to which are wired the negative electrodes of the storage cells 4. Another contact point 9, is connected to the positive electrodes of the storage cells 4 and to the positive terminal pole 5. The switch 3 can also be connected to the other contact point 9. The storage cells 4 may also be connected directly to the negative terminal 6 and the switch 3 disposed between the positive electrodes of the storage cells 4 and the terminal 5. The contact point 9 must then be connected to the negative electrodes of the storage cells 4 and to the terminal pole 6. If required, all elements of the circuit except for the Zener diode 1 may, of course, be mounted inside the battery, because they are temperature-insensitive.

The protective circuit associated with the parallel-connected storage cells 4 shown in FIG. 5 can also be used for a single storage cell. The arrangement is then like the circuit shown in FIG. 4.

Figure 6:
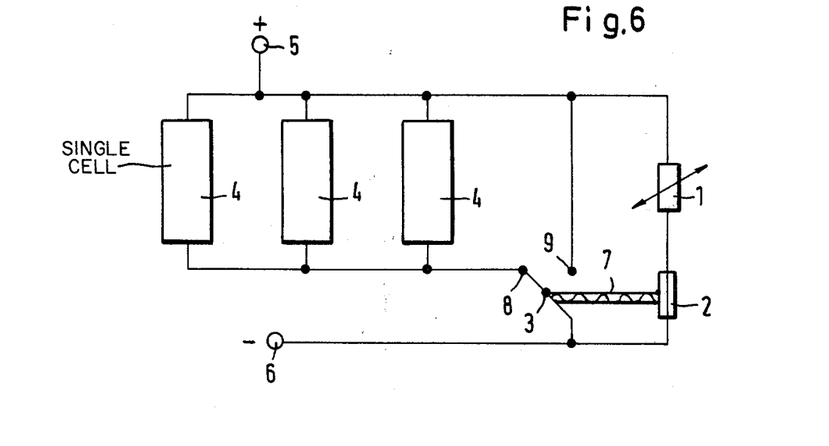
FIG. 6 shows several parallel-connected storage cells in connection with a circuit with a voltage-dependent resistor and a heating element.

Another embodiment of the protective circuit is depicted in FIG. 6. Provided therein is a voltage-dependent resistor instead of the Zener diode 1. Voltage-dependent resistor 1 as well as the positive electrodes of the three storage cells are connected to the positive electric terminal 5 on the one hand. On the other hand resistor 1 is connected to the negative terminal 6 via the heating element 2. Here too, there is a heat-conducting connection 7 between the heating element 2 and the switch 3. In the normal operating mode the switch 3 establishes the connection between the negative electrodes of the storage cells 4 and the negative electric terminal 6. For this purpose the switch is disconnectably connected to the contact point 8. If in the event of a possible underdischarge, the switch 3 is connected to the contact point 9 by the effect of the heating element 2 and the storage cells 4 are cut out of the circuit. The contact point 9 is wired to the positive electrodes of the storage cells and to the terminal 5. The positive storage cell electrodes may also be connected to the positive electric terminal pole 5 via tht switch 3 and the negative storage cell electrodes connected directly to the negative electric terminal 6. The contact point 9 is connected to the negative terminal 6 in this circuit also.

Figure 7:
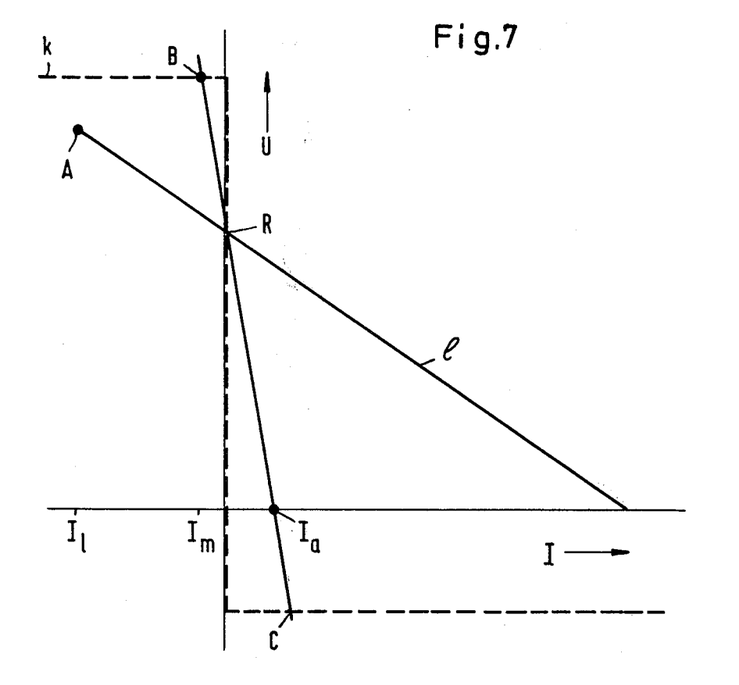
FIG. 7 is a diagram showing the idealized current-/voltage characteristic of a storage cell.

The operation of the protective circiuits depicted in FIGS. 1 to 6 is explained in greater detail in the following. The idealized current/voltage characteristic of a storage cell 4 shown in FIG. 7 will serve to better explain the operation of the protective circuits and of the storage cells. The operation of the protective circuits is always the same, regardless of whether they are connected to a single storage cell or to a group of several storage cells connected in parallel. Therefore, reference is made only to the arrangements shown in FIGS. 1, 2, 3, 5, and 6. But all statements apply as well to the arrangement shown in FIG. 4.

To charge the group of three parallel-connected storage cells 4, a power source (not shown here) furnishing the negative charging current $I_1$ is connected to the terminal poles 5 and 6. When all storage cells have attained the voltage designated A in FIG. 7, they are charged to their maximum capacity. An equalizing current effecting the uniform charged state of all storage cells flows between several parallel-connected storage cells 4 of a group.

The resistance of the storage cells 4 has become high by being charged, i.e. the current flowing through them is becoming smaller. While being charged, the voltage of the storage cells 4 can increase up to the maximum designated B. As may be seen from the diagram in FIG. 7, only a very small current $I_m$ is now flowing through the storage cells 4. This means that other groups connected in series with this group and not fully charged to their maximum capacity as yet can be charged no further. Expressed differently, this means that, in a series-connection, the group of storage cells having the lowest capacity determines the total capacity of all storage cells of the battery.

Connecting a circuit according to the invention to every group forming the battery makes it possible to charge completely all series-connected groups of parallel-connected storage cells. As, for example, the protective circuit shown in FIG. 1 contains a silicon carbide diode 1A poled in the forward direction. The forward voltage of this diode is adapted to the maximum charging voltage of the storage cells of this group so that no current flows through the diode 1A before this voltage is reached. In case the charging voltage should be considerably greater, the forward voltage can be increased by connecting two or more such diodes 1A in series. None of the two diodes 1A and 1B will respond as long as the storage cells are being charged. But when the storage cells 4 have reached a voltage shown as B in FIG. 7, their maximum charging voltage and hence also the forward voltage of the diode 1A is attained. This means that now the charging current no longer flows through the storage cells 4, but through the diode 1A. Since the diode 1B is poled in the blocking direction, no current flows through it and the heating element 2. Accordingly, the response of the diode 1A gives exact information regarding the time when the group of storage cells 4 is fully charged. By connecting an indicating instrument to the diode 1A this moment can be picked up and indicated visually.

Thus, with the circuit according to the invention the circuit of the group of storage cells 4 already charged is bridged until all groups or all storage cells of a battery are charged to their maximum capacity.

The intersection of the curve 1 in FIG. 1, which characterizes the respective charging condition of a storage cell, with the ordinate U is called the rest potential R of the storage cell.

If the storage cells have the rest potential R indicated in FIG. 5, or if a load is applied to the battery, the voltage of the storage cells drops again below the forward voltage of the diode 1A. The bridging of the storage cell circuit is thus nullified. The current between the terminal poles 5 and 6 flows again through the storage cells 4.

If a continuous load is applied to a group of storage cells having such a rest potential R, a discharge current will flow and the voltage of the storage cells will decrease until it reaches zero and a short-circuit current flows.

If at this point in time the groups connected in series with this group are not yet completely discharged, an extraneous current $I_a$ is impressed on this already discharged group. This causes polarity reversal of the cell voltage, i.e. the latter becomes negative and can, for example, attain the value designated C in the diagram. Since, as already mentioned above, the diode 1B which is poled in the blocking direction and becomes current-carrying when the storage cells reach a negative discharge voltage, is provided in the protective circuit, the extraneously impressed current $I_a$ now flows through this diode 1B and the heating element 2. Due to the fact that the extraneously impressed current $I_a$ is very large, the heating element 2 responds. The heating element affects the switch 3 via the heat-conducting connection 7 and breaks its hitherto existing contact with the contact point 8. Due to the thermal action of the heating element 2 the switch 3 is shifted so far that an electrically conducting connection between it and the contact point 9 comes about. The storage cells 4 are thus separated from the circuit and protected from destruction. The other still partly charged storage cells of the battery can continue to discharge unhindered until completely discharged.

If the protective circuit shown in FIG. 5 and containing a Zener diode is shunted across the parallel-connected storage cells of a battery, the circuit through the storage cells is likewise interrupted upon the attainment of the maximum charging voltage as well as upon the attainment of a given discharge voltage. For this purpose a Zener diode 1, the rated voltage of which corresponds to the maximum charging voltage of the storage cells, is used in the protective circuit. When the storage cells being charged have reached a voltage corresponding to the voltage having the value B, then the rated voltage required for the Zener diode 1 is also reached. This means that the current now no longer flows through the storage cells, but through the Zener diode. Since this current is relatively small, the heating element 2 does not respond. Therefore, the circuit of the already charged storage cells can also be bridged by the circuit shown in FIG. 5 until all other storage cells of the battery have been charged to their maximum capacity.

When a load is applied to the battery, the voltage of the storage cells drops again below the rated voltage of the Zener diode so that the current flows again through the hitherto interrupted circuit and the Zener diode is blocked again. If the load continues to be applied to the storage cells, the discharge current will flow until the voltage of the cells has reached zero and a short-circuit current flows.

If the groups connected in series with this group are not yet discharged completely at this point in time, an extraneous current $I_a$ is impressed on the already discharged group of storage cells. This current $I_a$ is transferred to the Zener diode whose forward voltage is relatively small and which is built into the protective circuit. Since the current now flowing through the Zener diode is very large, the heating element 2, connected in series with it, responds. The heating element 2 through the heat-conducting connection 7, influences the contact of the switch 3. The hitherto existing contact with the contact point 8 is broken and the electrical contact of switch 3 is connected to the contact point 9.

If, as shown in FIG. 6, the protective circuit is equipped with voltage-dependent resistor 1 connected in series with a heating element 2, the circuit through the storage cells 4 is bridged upon reaching their maximum voltage and the current is taken over by the voltage-dependent resistor 1. The same applies to the case where the storage cells 4 have reached a certain discharge voltage. The extraneous current $I_a$ impressed on the storage cells 4 not yet discharged is again taken up by the voltage-dependent resistor 1. The latter again causes the heating element to respond, whereby the switch 3 is disconnected from the contact point 8 and connected to the contact point 9.

As already mentioned repeatedly, the heating element 2 is connected to the switch 3 via the heat-conducting connection 7. To be able to disconnect the electrically conducting contact of switch 3 from the contact point 8, the heat generated by the heating element is fed via the connecting line 7 to a bimetal or strip, for example, which controls the electrically conducting contact of switch 3. Other temperature-controlled elements for the actuation of the contact may also be used. It is also possible, furthermore, to dispose relay transmitting mechanical forces between the heating element 2 and the switch 3 to control the latter's contact.

The connection of switch 3 to the contact point 9 may be limited in time or may be permanent. The protective circuit may be designed so that the connection of switch 3 to the contact point 9 is irreversible. This is the case when the electrically conducting contact of switch 3 is controlled via a fuse. This means that the endangered cell group can be put in operation again only by an intervention in the shop, after all cells have been tested and recharged. But the circuit may also be designed so that the switch 3 is connected to the contact point 9 for a finite period of time only, i.e. a brief over-discharge is corrected again by reducing the current, a rest period and a recharge.

Figure 8:
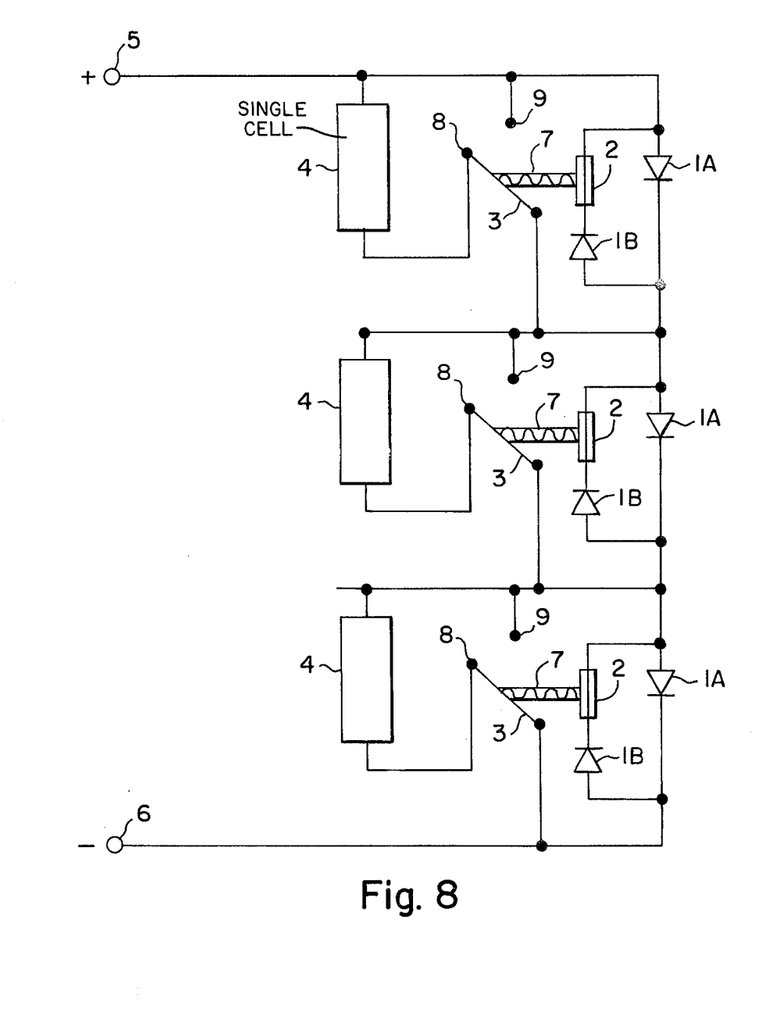
FIG. 8 shows three series-connected storage cells with a protection circuit across each cell.

FIG. 8 shows three electrochemical storage cells connected in series. Each storage cell is protected by a protective circuit according to the invention. The protective circuit effects the optimal protection of the storage cell to which it is connected in parallel.

For the charging of the three in series connected storage cells 4 a current source (here not shown) is connected to the connecting poles 5 and 6 (terminals 5 and 6). The negative charging current $I_i$ flows through the three in series connected storage cells from one connecting pole to the other. Each of the three protective circuits is so designed that it does not respond before the maximal charging voltage, respectively, discharging voltage of the storage cell to be protected, is reached.

During the charging operation the possibility exists that one of the three storage cells reaches its maximal charging voltage first. In this moment the diode 1A of its protective circuit responds. Now the current from the current source stops flowing through this charged storage cell, and flows through the diode 1A of its protection circuit to the next storage cell in the series. In the moment this cell also reaches its maximal charging voltage, the current flows through the diode 1A of its protection circuit. When all three storage cells are fully loaded the total charging current flows through the three diodes 1A.

At the discharging of these storage cells the discharge current flows through the in series connected storage cells from one connecting pole to the other first. This goes on until one of cells has reached its maximal discharge voltage. Then the current flows only through the not completely discharged cells, and through the diode 1B and the following heating element 2 which are connected parallel to the discharged storage cell 4. The current $I_a$ flowing through the diode 1B is very large, so that the heating element 2 is activated. Through the thermal conductive connection 7 the heating element acts on switch 3, and interrupts its connection with the contact point 8. The switch 3 is moved by the heat action so far that an electrically conducting connection is established between it and contact point 9. The connection of switch 3 with the contact point 9 can be effected for a limited time, or permanently. The protective circuit in parallel with each storage cell can be so constructed that the connection of switch 3 with contact point 9 is irreversible. This is the case, if the electrically conducting contact of the switch is controlled by a melt-fuse. This means that the three storage cells in series can only be put in operation by work done in the factory, after all storage cells have been examined, and again set in operation.

However, the protective circuit according to the invention can also be so designed that the switch 3 is connected with contact point 9 for only a limited time, i.e. that an over-discharge lasting a short time is corrected by a reduction of current, a rest period and again charging thereafter.

In a series arrangement of two, or several electrochemical storage cells such a protective circuit is arranged in parallel with each storage cell in order to protect the latter optimally against over-charging or over-discharging.

A simplified embodiment of the invention would be obtained by omitting the heating element 2 and the switch 3 and by shunting across the storage cells a Zener diode only which takes over the current at the instant the impedance of the storage cells becomes high for whatever reason.

There are claimed:

1. Electrochemical storage cells of the alkali metal and chalcogen type, connected to form a battery which can be uniformly charged and discharged, in which series-connected cells having positive and negative electrodes as individual cells or groups of several parallel-connected storage cells are series-connected to form a battery having a positive terminal and a negative terminal with the cell having an anode chamber for containing alkali metal anolyte and a cathode chamber for containing chalcogen catholyte, with the anode chamber separated from the cathode chamber by an alkali ion-conducting solid electrolyte, a protective circuit shunted across each said series-connected cell which bridges the circuit through said series-connected cell upon said series-connected cell reaching a given maximum charge or discharge, a switch conductively connectible directly to the negative and positive electrodes of said series-connected cells and to the terminals of the battery, said protective circuit in operational contact with said switch, said protective circuit connected with each cell terminals, and said series-connected cells connected to one of the two terminals of the battery via said switch and, wherein the protective circuit is formed of at least one first series-connected diode across which is shunted a series-connection comprising at least one heating element and a second diode with the first diode poled in forward direction and the second diode in blocking direction.

2. Electrochemical storage cells according to claim 1, wherein the series-connected cells are individual cells connected in series.

3. Electrochemical storage cells according to claim 1, wherein the series-connected cells are groups of several parallel-connected cells connected in series.

4. Electrochemical storage cells according to claim 1, wherein the diodes are made with p-n junctions.

5. Electrochemical storage cells according to claim 1, wherein the diodes are made with Schottky barriers of a material having a band gap of more than 1.2 eV, and corresponding to a compound selected from the group consisting of the III, V, II and VI groups of the periodic system.

6. Electrochemical storage cells according to claim 1, wherein the diodes are selected from the group consisting of gallium arsenide, gallium phosphate, silicon carbide, boron nitride and cadmium sulfied diodes.

7. Electrochemical storage cells according to claim 1, wherein the diodes are integrated as components in each storage cell.

8. Electrochemical storage cells according to claim 1, wherein the first diode has a forward voltage equal to the maximum charging voltage of the storage cells of a group.

9. Electrochemical storage cells according to claim 1, wherein the second diode is current-carrying for negative discharge voltages of the storage cells of a group.

10. Electrochemical storage cells of the alkali metal and chalcogen type, connected to form a battery which can be uniformly charged and discharged, in which series-connected cells having positive and negative electrodes as individual cells or groups of several parallel-connected storage cells are series-connected to form a battery having a positive terminal and a negative terminal with the cell having an anode chamber for containing alkali metal anolyte and a cathode chamber for containing chalcogen catholyte, with the anode chamber separated from the cathode chamber by an alkali ion-conducting solid electrolyte, a protective circuit shunted across each said series-connected cell which bridges the circuit through said series-connected cell upon said series-connected cell reaching a given maximum charge or discharge, a switch conductively connectible directly to the negative and positive electrodes of said series-connected cells and to the terminals of the battery, said protective circuit in operational contact with said switch, said protective circuit connected with each cell terminals, and said series-connected cells connected to one of the two terminals of the battery via said switch and, wherein the protective circuit comprises a series-connection of a Zener diode and a heating element.

11. Electrochemical storage cells according to claim 10, wherein the rated voltage of the Zener diode equals the maximum charging voltage of the storage cells and wherein the Zener diode is also current-carrying for a discharge voltage of the storage cells, starting at $-0.7$ V.

12. Electrochemical storage cells of the alkali metal and chalcogen type, connected to form a battery which can be uniformly charged and discharged, in which series-connected cells having positive and negative electrodes as individual cells or groups of several parallel-connected storage cells are series-connected to form a battery having a positive terminal and a negative terminal with the cell having an anode chamber for containing alkali metal anolyte and a cathode chamber for containing chalcogen catholyte, with the anode chamber separated from the cathode chamber by an alkali ion-conducting solid electrolyte, a protective circuit shunted across each said series-connected cell which bridges the circuit through said series-connected cell upon said series-connected cell reaching a given maximum charge or discharge, a switch conductively connectible directly to the negative and positive electrodes of said series-connected cells and to the terminals of the battery, said protective circuit in operational contact with said switch, said protective circuit connected with each cell terminals, and said series-connected cells connected to one of the two terminals of the battery via said switch and, wherein the protective circuit comprises a series-connection of a voltage-dependent resistor and a heating element.

13. Electrochemical storage cells according to claim 12, wherein the resistor is adjustable to the maximum charging and discharging voltage of the storage cells and is current-carrying from these voltages on.

14. Electrochemical storage cells according to claim 4, or claim 5, or claim 6, or claim 7, or claim 11, or claim 13, wherein the heating element and the switch are connected to each other via a heat-conducting connection.

15. Electrochemical storage cells of the alkali metal and chalcogen type, connected to form a battery which can be uniformly charged and discharged, in which series-connected cells having positive and negative electrodes as individual cells or groups of several parallel-connected storage cells are series-connected to form a battery having a positive terminal and a negative terminal, with the cell having an anode chamber for containing alkali metal anolyte and a cathode chamber for containing chalcogen catholyte, with the anode chamber separated from the cathode chamber by an alkali ion-conducting solid electrolyte, a protective circuit shunted across each said series-connected cell which bridges the circuit through said series-connected cell upon reaching a maximum charge or discharge, wherein the protective circuit is formed of at least one first series-connected diode across which is shunted a series-connection comprising at least one heating element and a second diode with the first diode poled in forward direction and the second diode in blocking direction.

16. Electrochemical storage cells of the alkali metal and chalcogen type, connected to form a battery which can be uniformly charged and discharged, in which series-connected cells having positive and negative electrodes as individual cells or groups of several parallel-connected storage cells are series-connected to form a battery having a positive terminal and a negative terminal, with the cell having an anode chamber for containing alkali metal anolyte and a cathode chamber for containing chalcogen catholyte, with the anode chamber separated from the cathode chamber by an alkali ion-conducting solid electrolyte, a protective circuit shunted across each said series-connected cell which bridges the circuit through said series-connected cell upon reaching a maximum charge or discharge, wherein the protective circuit comprises a series-connection of a Zener diode and a heating element.

17. Electrochemical storage cells of the alkali metal and chalcogen type, connected to form a battery which can be uniformly charged and discharged, in which series-connected cells having positive and negative electrodes as individual cells or groups of several parallel-connected storage cells are series-connected to form a battery having a positive terminal and a negative terminal, with the cell having an anode chamber for containing alkali metal anolyte and a cathode chamber for containing chalcogen catholyte, with the anode chamber separated from the cathode chamber by an alkali ion-conducting solid electrolyte, a protective circuit shunted across each said series-connected cell which bridges the circuit through said series-connected cell upon reaching a maximum charge or discharge, wherein the protective circuit comprises a series-connection of a voltage-dependent resistor and a heating element.

18. Electrochemical storage cells according to claim 15, or claim 16, or claim 17, wherein the series-connected cells are individual cells connected in series.

19. Electrochemical storage cells according to claim 15, or claim 17, or claim 18, wherein the series-connected cells are groups of several parallel-connected cells connected in series.

* * * * *